(12) United States Patent
Joly et al.

(10) Patent No.: US 11,092,030 B2
(45) Date of Patent: Aug. 17, 2021

(54) ADAPTIVE CASE FOR A GAS TURBINE ENGINE

(71) Applicant: United Technologies Corporation, Farmington, CT (US)

(72) Inventors: Michael M. Joly, Hebron, CT (US); Andrzej Ernest Kuczek, Bristol, CT (US); Zaffir A. Chaudhry, Glastonbury, CT (US); Gorazd Medic, West Hartford, CT (US); Dilip Prasad, North Granby, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 273 days.

(21) Appl. No.: 16/388,199

(22) Filed: Apr. 18, 2019

(65) Prior Publication Data

US 2020/0332673 A1  Oct. 22, 2020

(51) Int. Cl.
  *F01D 11/22*  (2006.01)
  *F01D 9/04*  (2006.01)
(52) U.S. Cl.
  CPC .............. *F01D 11/22* (2013.01); *F01D 9/047* (2013.01); *F05D 2220/32* (2013.01); *F05D 2240/11* (2013.01); *F05D 2270/102* (2013.01)
(58) Field of Classification Search
  CPC ...................................................... F01D 11/22
  See application file for complete search history.

(56) References Cited

U.S. PATENT DOCUMENTS

| 3,227,418 | A | * | 1/1966 | West | F01D 11/22 |
| | | | | | 415/127 |
| 4,330,234 | A | | 5/1982 | Colley | |
| 6,146,089 | A | * | 11/2000 | Allen | F01D 11/12 |
| | | | | | 415/9 |
| 6,736,594 | B2 | | 5/2004 | Irie et al. | |
| 2008/0031721 | A1 | * | 2/2008 | Skotrikov | F04D 27/002 |
| | | | | | 415/14 |
| 2012/0315131 | A1 | | 12/2012 | Martens | |
| 2013/0315716 | A1 | * | 11/2013 | Cotroneo | F01D 11/22 |
| | | | | | 415/130 |
| 2016/0010652 | A1 | | 1/2016 | Lim et al. | |

FOREIGN PATENT DOCUMENTS

| EP | 2434614 | 3/2012 |
| FR | 3065745 | 11/2018 |
| JP | H10122197 | 5/1998 |
| JP | 2003227497 | 8/2003 |

OTHER PUBLICATIONS

Extended EP Search Report for EP Application No. 20168523.7 dated Sep. 4, 2020.

* cited by examiner

*Primary Examiner* — Justin D Seabe
(74) *Attorney, Agent, or Firm* — Carlson, Gaskey & Olds, P.C.

(57) ABSTRACT

A gas turbine engine includes a plurality of blades circumferentially spaced from each other. A plurality of rings are spaced radially outward from the plurality of blade. At least one actuator is in mechanical communication with the plurality of rings for moving the plurality of rings in an axial direction to create an axial gap adjacent at least one of the plurality of rings.

20 Claims, 6 Drawing Sheets

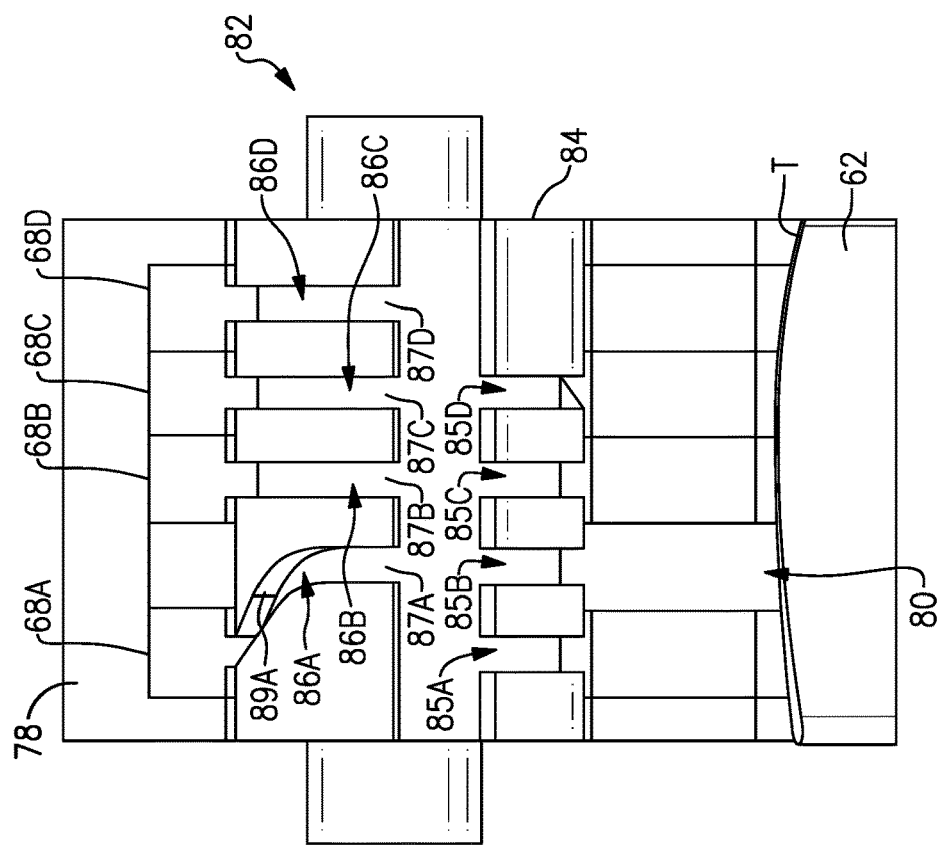
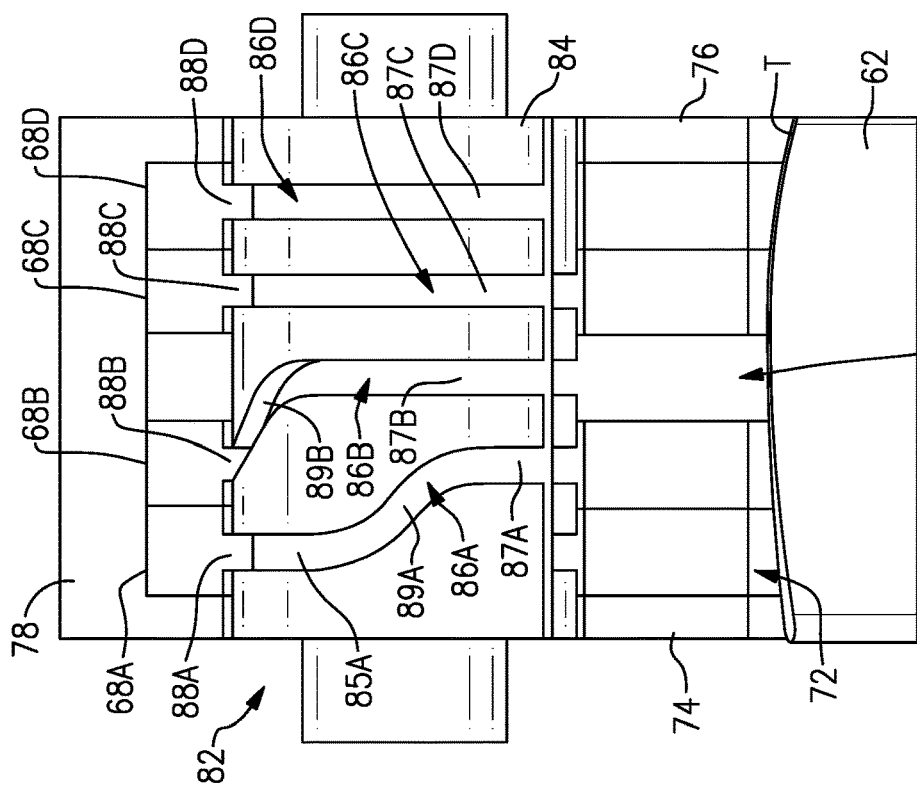

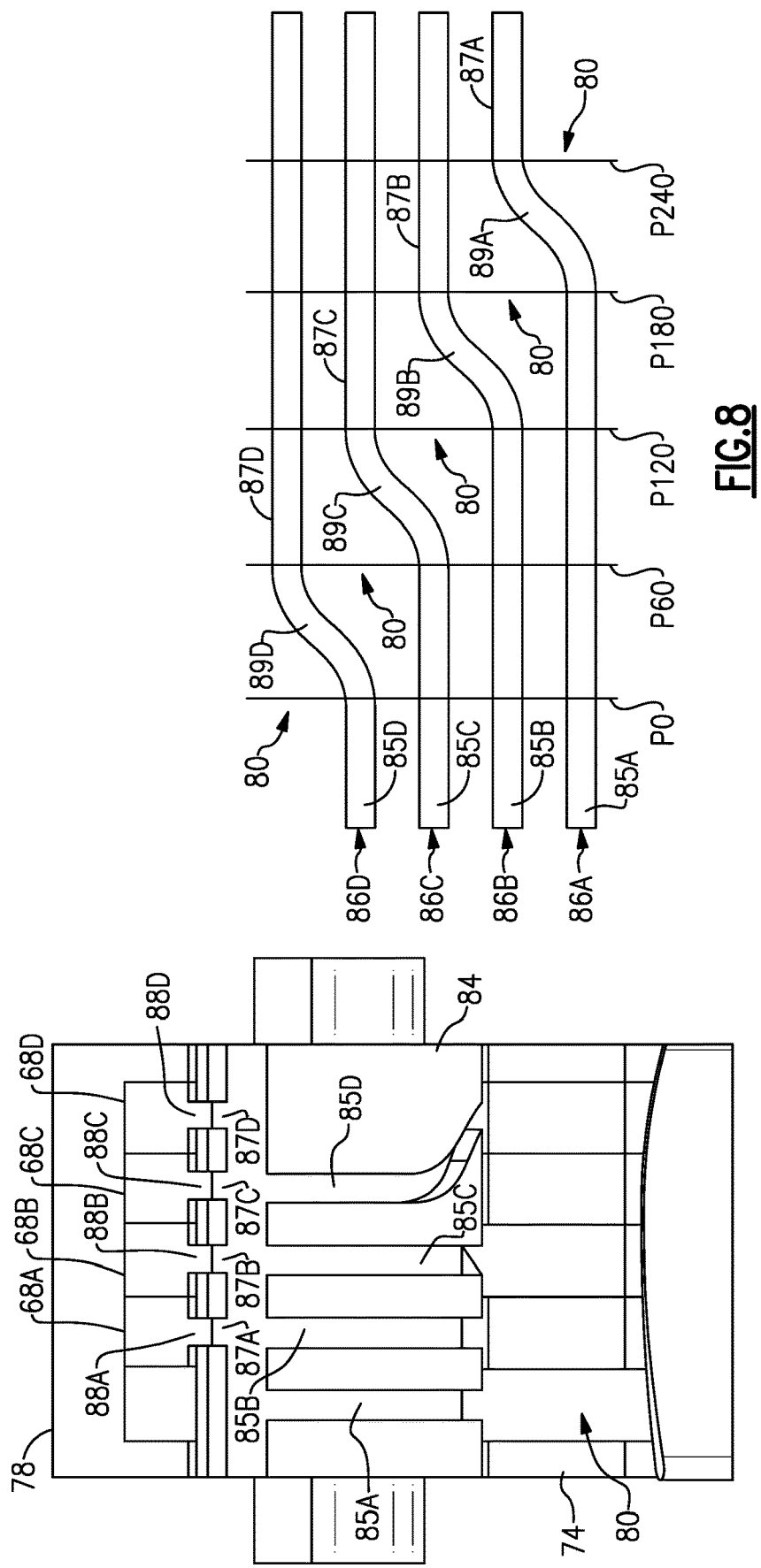

US 11,092,030 B2

ADAPTIVE CASE FOR A GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

During operation of the gas turbine engine, the compressor may become susceptible to performance deficiencies resulting from unstable air flow. One type of unstable air flow occurs when a compressor blade enters a stall condition. The blades in the compressor enter a stall condition when a pressure at the compressor outlet instantaneously rises beyond an appropriate range causing the air flow at the compressor inlet to separate from a blade surface in the compressor.

SUMMARY

In one exemplary embodiment, a gas turbine engine includes a plurality of blades circumferentially spaced from each other. A plurality of rings are spaced radially outward from the plurality of blade. At least one actuator is in mechanical communication with the plurality of rings for moving the plurality of rings in an axial direction to create an axial gap adjacent at least one of the plurality of rings.

In a further embodiment of the above, a housing extends along a central longitudinal axis and has an opening facing radially inward with the plurality of rings locating within the housing adjacent the opening.

In a further embodiment of any of the above, the axial gap is located between an axial end of the housing and one of the plurality of rings.

In a further embodiment of any of the above, the axial gap is located between adjacent rings of the plurality of rings.

In a further embodiment of any of the above, the plurality of rings engage at least one cam to move at least one of the plurality of rings an in axial direction.

In a further embodiment of any of the above, the cam includes a plurality of grooves that engage a corresponding tab on one of the plurality of rings.

In a further embodiment of any of the above, each of the plurality of grooves include a first portion axially spaced from a second portion by an offset portion.

In a further embodiment of any of the above, the offset portion for each of the plurality of grooves is circumferentially spaced from the offset portion in an adjacent one of the plurality of grooves.

In a further embodiment of any of the above, at least one cam includes a plurality of cams spaced around an axis of rotation of the gas turbine engine.

In another exemplary embodiment, a casing structure for a gas turbine engine includes a housing that extends along a central longitudinal axis and has an opening facing radially inward. A plurality of rings are located within housing adjacent the opening. At least one actuator is in mechanical communication with the plurality of rings to create an axial gap located adjacent at least one of the plurality of rings.

In a further embodiment of any of the above, the axial gap is located between an axial end of the housing and one of the plurality of rings.

In a further embodiment of any of the above, the axial gap is located between adjacent rings of the plurality of rings.

In a further embodiment of any of the above, the plurality of rings engage at least one cam to move at least one of the plurality of rings an in axial direction.

In a further embodiment of any of the above, at least one cam includes a plurality of circumferentially extending grooves that engage a corresponding tab on one of the plurality of rings.

In a further embodiment of any of the above, each of the plurality of grooves include a first portion axially spaced from a second portion by an offset portion.

In a further embodiment of any of the above, the offset portion for each of the plurality of grooves is circumferentially spaced from a job in an adjacent one of the plurality of grooves.

In a further embodiment of any of the above, at least one cam includes a plurality of cams spaced around an axis of rotation of the gas turbine engine.

In another exemplary embodiment, a method of controlling an axial gap in a casing structure in a gas turbine engine includes the step of engaging at least one ring with a mechanical connection attached to an actuator. At least one ring is moved in a first axial direction based on a first operating condition of the gas turbine engine to create an axial gap in the casing structure. At least one ring is moved in a second axial direction based on a second operating condition of the gas turbine engine.

In a further embodiment of any of the above, the first operating condition includes cruise engine speed and the first axial direction is downstream.

In a further embodiment of any of the above, the second operating condition is includes transonic blade speed adjacent the casing structure and the second axial direction is upstream.

BRIEF DESCRIPTION OF THE DRAWINGS

FIG. 5 illustrates a sectional view of the casing structure with the plurality of rings in a third position.

FIG. 6 illustrates a sectional view of the casing structure with the plurality of rings in a fourth position.

FIG. 7 illustrates a sectional view of the casing structure with the plurality of rings in a fifth position.

FIG. 8 is a graphical representation of groove in a cam.

DETAILED DESCRIPTION

Figure 1:
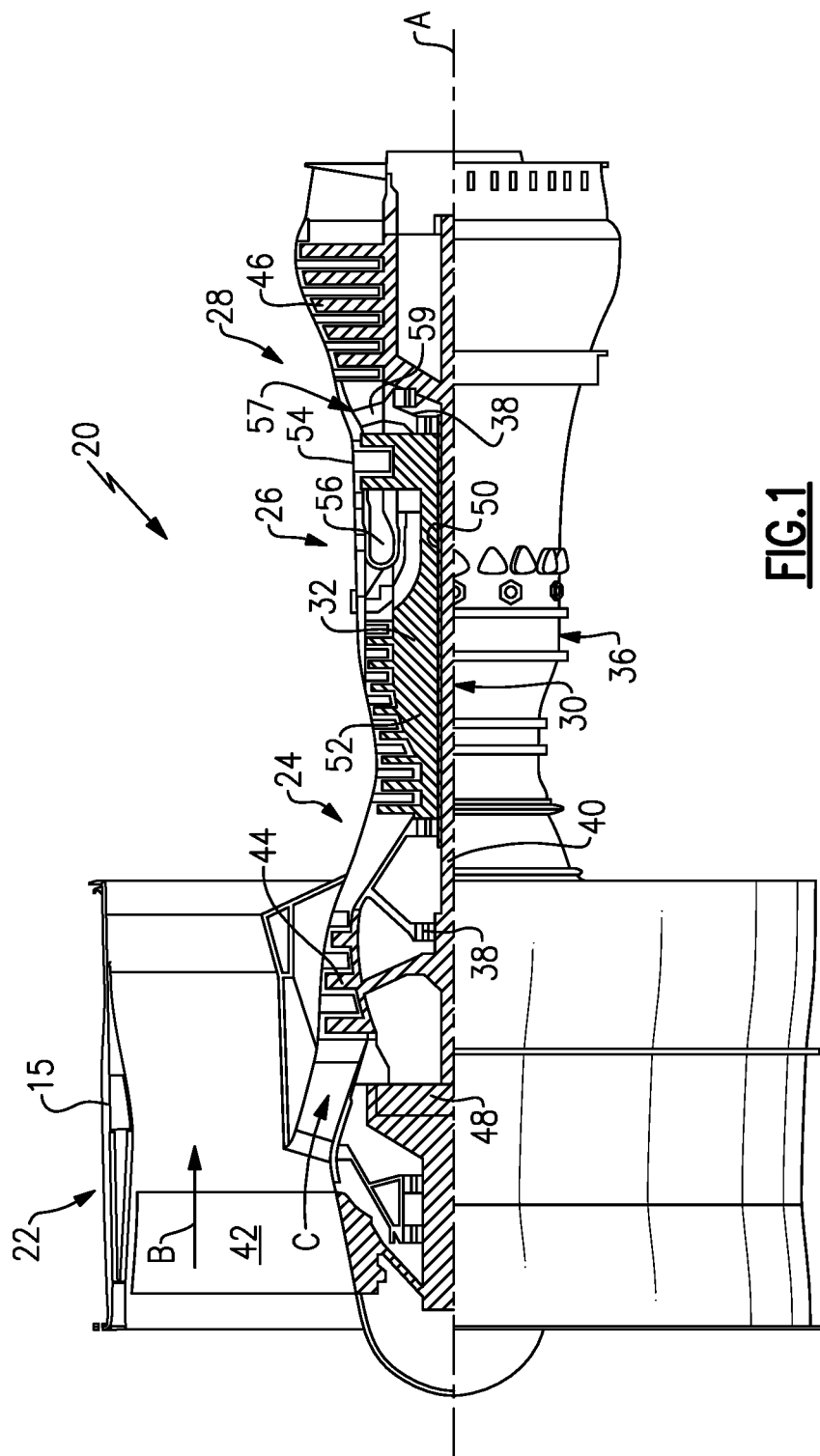
FIG. 1 is a schematic view of a gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
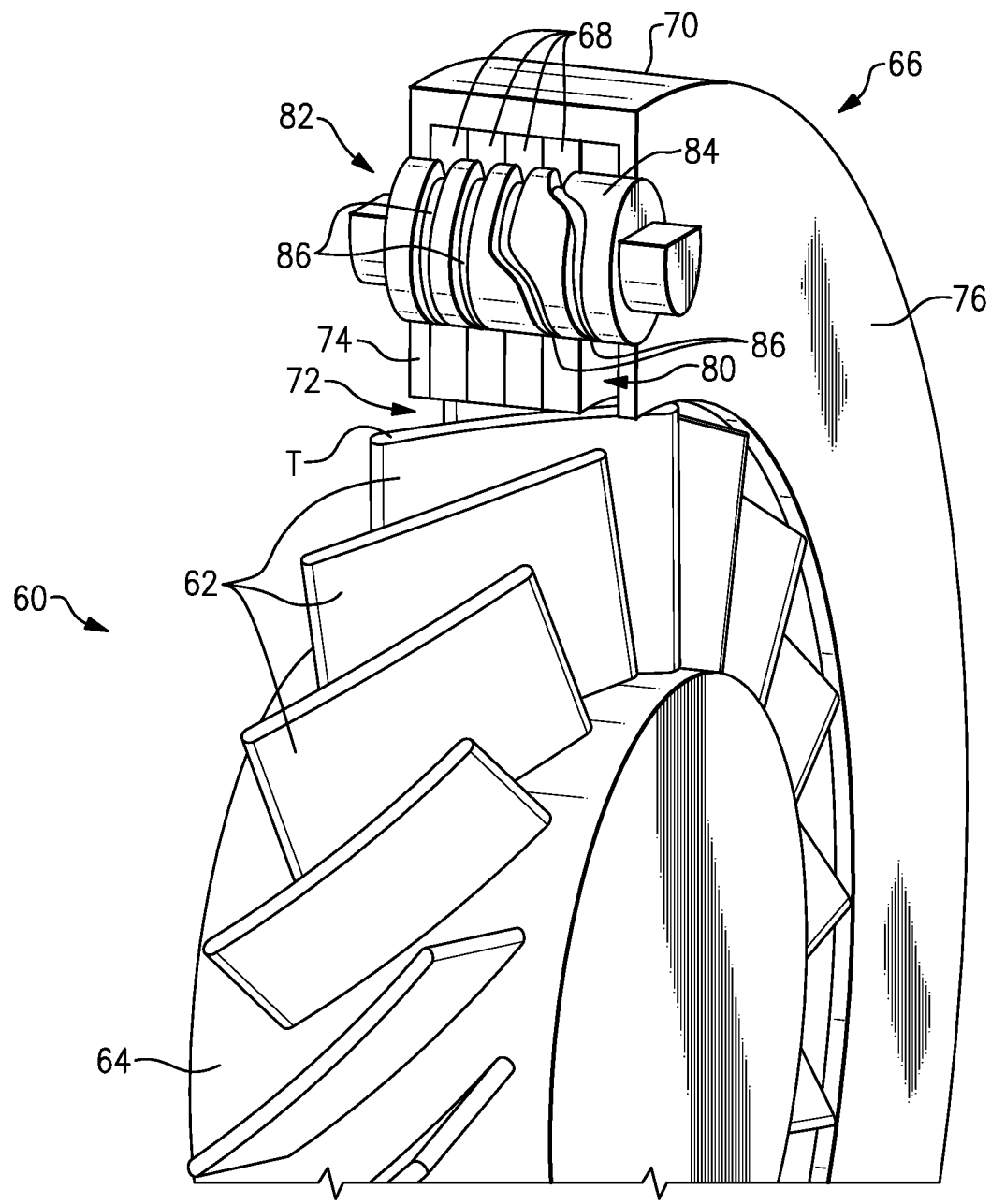
FIG. 2 illustrates a sectional view of a portion of a rotor assembly and casing structure.

FIG. 2 illustrates an example rotor assembly 60 having a plurality of rotor blades 62 circumferentially spaced around a hub 64 with an example casing structure 66 surrounding the rotor assembly 60. In the illustrated non-limiting example, the casing structure 66 includes a plurality of rings 68 located in a housing 70. The housing 70 includes a radially inward facing opening 72 that allows a radially inner facing surface of the rings 68 to be located adjacent radially outer tips T of the rotor blades 62 such that a small clearance gap exists between the tips T and the radially inner surface of the rings 68. Although the housing 70 is shown as being a separate component from the engine static structure 36, the housing 70 could be incorporated into the engine static structure 36 adjacent the compressor section 24 or the turbine section 28.

The housing 70 includes a forward wall 74 and an aft wall 76 connected to each other by a radially outer wall 78 spanning an axial distanced between the forward wall 74 and the aft wall 76. One of the forward wall 74 and the aft wall 76 could be attached to the radially outer wall 78 and the other of the forward wall 74 and the aft wall 76 could be integrally formed as a single piece with the radially outer wall 78. The attachment between the radially outer wall 78 and one of the forward walls 74 or the aft wall 76 could be a removable connection, such as with a bolted connection, or a permanent connection, such as with welding. In this disclosure, axial or axially and radial or radially is in relation to the engine axis A unless stated otherwise.

As will be described in more detail below, the housing 70 and the rings 68 at least partially define an axial gap 80 that is capable of moving in an axial direction along the engine axis A through the opening 72 in the housing 70 by operation of a cam 82. The cam 82 includes a cylindrical body portion 84 having a plurality of grooves 86 that at least partially circumscribe the cylindrical body portion 84. The cam 82 also extends through the forward wall 74 and the aft wall 76 of the housing 70. Because the cams 82 direct movement of the rings 68 as will be described in greater detail below, the number of additional locations to seal against air leakage in the casing structure 66 is limited to the penetrations of the cams 82 through the forward wall 74 and the aft wall 76.

Figure 3:
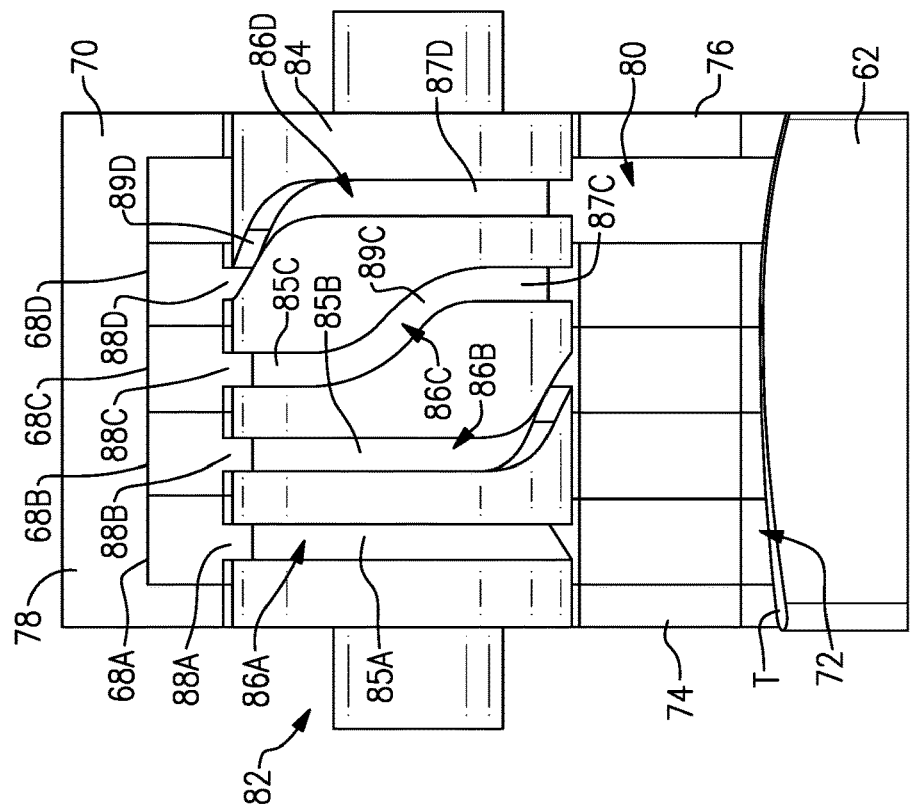
FIG. 3 illustrates a sectional view of the casing structure with a plurality of rings in a first position.

In the illustrated example, the cam 82 includes a first groove 86A, a second groove 86B, a third groove 86C, and a fourth groove 87D that each, respectively, engage a first tab 88A, a second tab 88B, a third tab 88C, and a fourth tab 88D on the first ring 68A, the second ring 68B, third ring 68C, and fourth ring 68D (FIG. 3). Although the illustrated example includes four rings 68A, 68B, 68C, and 68D and four corresponding grooves 86A, 86B, 86C, and 86D in the cam 82, more or less than four rings 68 and grooves 86 could be used with the casing structure 66 in this disclosure. Additionally, the rings 68 collectively define an axial length that is less than an axial length of the opening 72 to create the axial gap 80 in the casing structure 66.

As shown in FIG. 3, the rings 68A, 68B, 68C, and 68D are all arranged on an upstream portion of the opening 72 with the axial gap 80 located between the fourth ring 68D and the aft wall 76 of the housing 70. In the illustrated example, the axial gap 80 surrounds a downstream portion of the cam 82 such that the cam 82 extends through at least a portion of the axial gap 80. The position of the rings 68 and the cam 82 shown in FIG. 3 corresponds to the cam 82 being positioned at zero degrees.

A graphical representation of the first, second, third, and fourth grooves 86A, 86B, 86C, and 86D is shown in FIG. 8 with the zero degree position in FIG. 3 corresponding to line P0. The graphical representation in FIG. 8 represents the path the first, second, third, and fourth tabs 88A, 88B, 88C, and 88D travel through a respective one of the first, second, third, and fourth grooves 86A, 86B, 86C, 86D around the circular body portion 84 of the cam 82 as the cam 82 is rotated. The rings 68A, 68B, 68C, 68D, move axially due to the first, second, third, and fourth grooves 84A, 84B, 84C, and 84D each having a respective first portion 85A, 85B, 85C, and 85D separated from a second portion 87A, 87B, 87C, and 87D by an offset portion 89A, 89B, 89C, and 89D (FIGS. 3-8).

Figure 4:
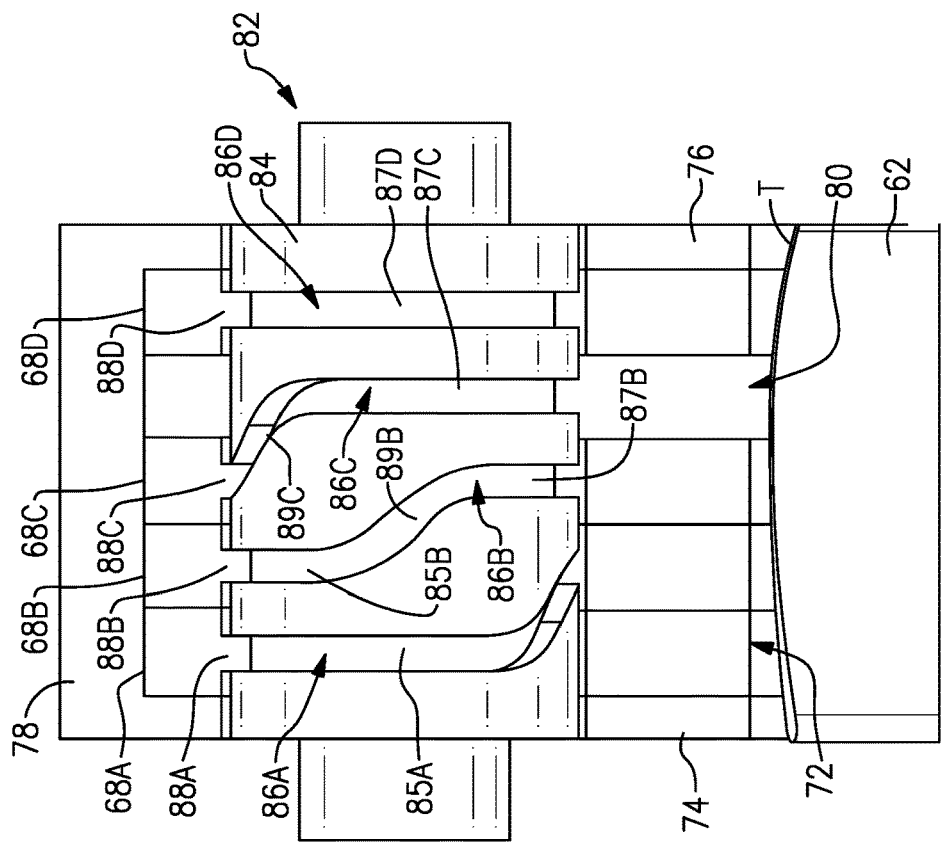
FIG. 4 illustrates a sectional view of the casing structure with the plurality of rings in a second position.

As shown in FIGS. 3-4 and 8, when the cam 82 is rotated from the zero degree position corresponding to line P0 to a 60 degree position corresponding to line P60, the tab 88D travels from the first portion 85D to the second portion 87D through the offset portion 89D. The change in axial position of the ring 68D corresponds to the axial offset between the first portion 85D and the second portion 87D resulting from of the offset portion 89D. The remaining tabs 88A, 88B, and 88C remain in the first portions 85A, 85B, and 85C of their respective grooves 86A, 86B, and 86C while the cam 82 is rotated from the P0 position to the P60 position.

As shown in FIGS. 4-5 and 8, when the cam 82 is rotated from the 60 degree position corresponding to line P60 to a 120 degree position corresponding to line P120, the tab 88C travels from the first portion 85C to the second portion 87C through the offset portion 89C. The change in axial position of the ring 68C corresponds to the axial offset between the first portion 85C and the second portion 87C resulting from of the offset portion 89C. The remaining tabs 88A and 88B remain in the first portions 85A and 85B of their respective grooves 86A and 86B while the cam 82 is rotated from the P60 position to the P120 position.

As shown in FIGS. 5-6 and 8, when the cam 82 is rotated from the 120 degree position corresponding to line P120 to a 180 degree position corresponding to line P180, the tab 88B travels from the first portion 85B to the second portion 87B through the offset portion 89B. The change in axial position of the ring 68D corresponds to the axial offset between the first portion 85B and the second portion 87B resulting from of the offset portion 89B. The remaining tab 88A remains in the first portion 85A of its respective groove 86A while the cam 82 is rotated from the P120 position to the P180 position.

As shown in FIGS. 6-7 and 8, when the cam 82 is rotated from the 180 degree position corresponding to line P180 to a 240 degree position corresponding to line P240, the tab 88A travels from the first portion 85A to the second portion 87A through the offset portion 89A. The change in axial position of the ring 68A corresponds to the axial offset between the first portion 85A and the second portion 87A resulting from of the offset portion 89A. When the cam 82 is in the position corresponding to line P240, all of the tabs 88A, 88B, 88C, and 88D are located in respective second portions 87A, 87B, 87C, and 87D of the grooves 86A, 86B, 86C, and 86D.

Figure 10:
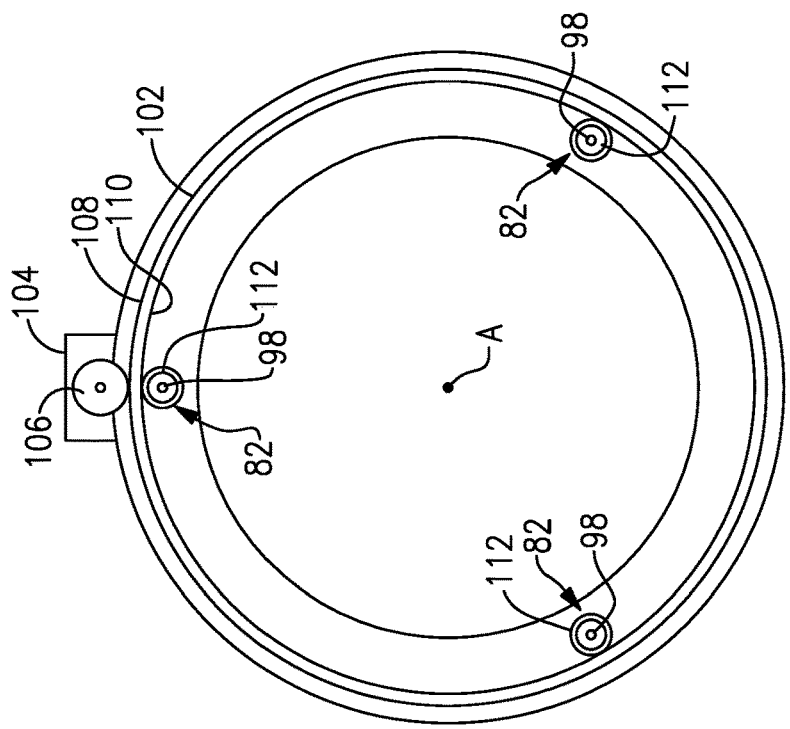
FIG. 10 illustrates another example actuation arrangement for the plurality of cams.
Figure 9:
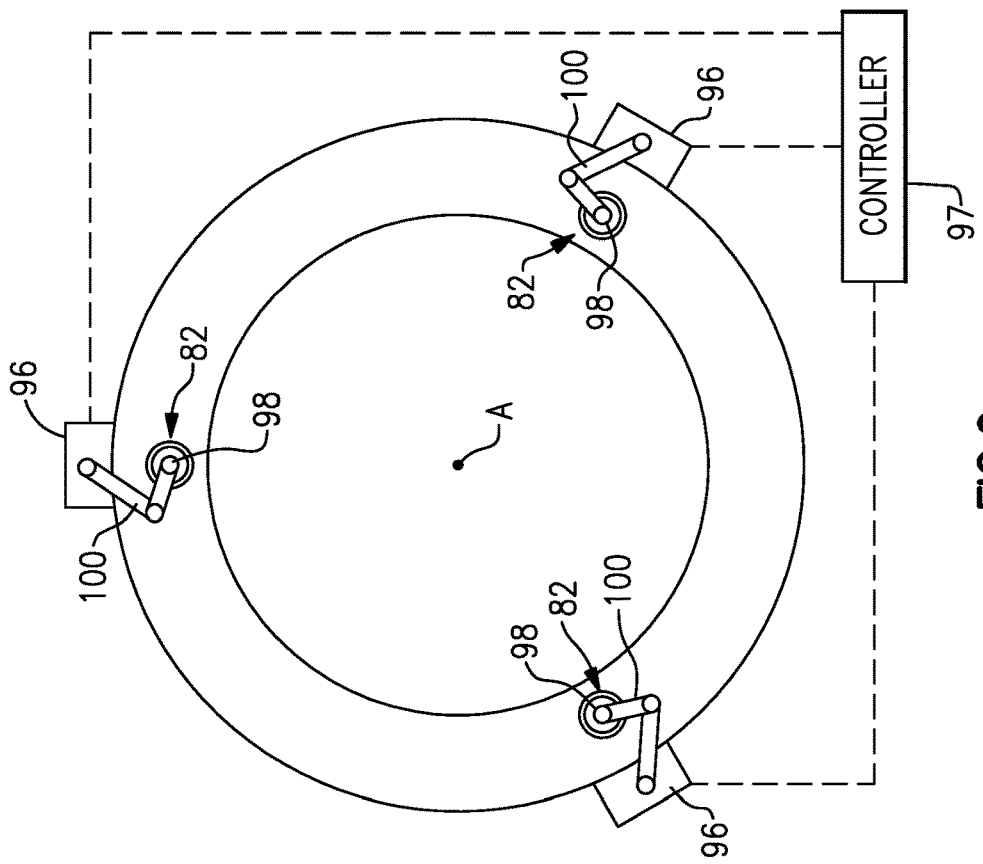
FIG. 9 illustrates an example actuation arrangement for a plurality of cams.

As shown in FIGS. 9 and 10, multiple cams 82 can be used to move the rings 68A, 68B, 68C, and 68D in unison. Regarding FIG. 9, the rotational movement of the cams 82 is controlled by individual actuators 96 mechanically connected with each cam attachment arm 98 on the cam 82 through a mechanical linkage 100. Each of the individual actuators 96 are controlled in unison by a controller 97 in electrical communication with each of the individual actuators 96. This allows each of the cams 82 to be maintained in the same rotation position to prevent binding of the rings 68 during operation.

Regarding FIG. 10, the rotational movement of the cams 82 are linked together in unison by a sync ring 102 driven by a single actuator 104 that includes a gear 106 that engages a radially outer toothed surface 108 on the sync ring 102. The sync ring also includes a radially inner toothed surface 110 that engages a cam gear 112 attached to the cam attachment arm 98 to rotate each of the cams 82. Although the actuator 104 engages the sync ring 102 with a geared connection, other types of mechanical connections could be used such as a mechanical linkage.

A desired axial position of the axial gap 80 in the opening 72 is selected based on a number of operating conditions. In one example, when the blades 62 are approaching a stall condition, the axial gap 80 can be located in a forward portion of the opening 72 as shown in FIGS. 5-7 to prevent the air flow instability resulting from a stall condition from occurring. In another example, when the blades 62 are experiencing transonic speeds, the axial gap 80 can be located in an aft portion of the opening 72 as shown in FIGS. 3-4 to enhance an over-speed choke margin of the gas turbine engine 20. By controlling the axial position of the axial gap 80, the casing structure can accommodate multiple points of efficiency of the rotor assembly 60 instead of being limited to having the axial gap 80 located in only a single position.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
    a plurality of blades circumferentially spaced from each other;
    a plurality of rings spaced radially outward from the plurality of blades; and
    at least one actuator in mechanical communication with the plurality of rings for moving the plurality of rings in an axial direction to create an axial gap adjacent at least one ring of the plurality of rings, wherein the at least one ring is moveable relative to another ring of the plurality of rings.

2. The gas turbine engine of claim 1, further comprising a housing extending along a central longitudinal axis having an opening facing radially inward with the plurality of rings located within the housing and adjacent the opening.

3. The gas turbine engine of claim 2, wherein the axial gap is located between an axial end of the housing and one of the plurality of rings.

4. The gas turbine engine of claim 2, wherein the axial gap is located between adjacent rings of the plurality of rings with a downstream facing surface of a first ring of the adjacent rings defining a first axial end of the of axial gap and a second ring of the adjacent rings defining a second axial end of the axial gap.

5. The gas turbine engine of claim 1, wherein the plurality of rings engage at least one cam to move at least one of the plurality of rings in an axial direction relative to another one of the plurality of rings.

6. The gas turbine engine of claim 5, wherein the cam includes a plurality of grooves that engage a corresponding tab on each of the plurality of rings.

7. The gas turbine engine of claim 6, wherein each of the plurality of grooves include a first portion axially spaced from a second portion by an offset portion, wherein the first portion extends in a circumferential direction having a first constant axial position and the second portion extends in a circumferential direction having a second constant axial position spaced axially from the first constant axial position.

8. The gas turbine engine of claim 7, wherein the offset portion for each of the plurality of grooves is circumferentially spaced from the offset portion in an adjacent one of the plurality of grooves and the offset portion in a circumferential and axial direction from the first constant axial position to the second constant axial position.

9. The gas turbine engine of claim 5, wherein the at least one cam includes a plurality of cams spaced around an axis of rotation of the gas turbine engine and each of the plurality if cams is cylindrical having a constant radius to an outermost surface.

10. A casing structure for a gas turbine engine comprising:
a housing extending along a central longitudinal axis having an opening facing radially inward;
a plurality of rings locating within housing adjacent the opening; and
at least one actuator in mechanical communication with the plurality of rings to create an axial gap located adjacent at least one ring of the plurality of rings, wherein the at least one ring is moveable relative to another ring of the plurality of rings.

11. The casing structure of claim 10, wherein the axial gap is located between an axial end of the housing and one of the plurality of rings.

12. The casing structure of claim 10, wherein the axial gap is located between adjacent rings of the plurality of rings with a downstream facing surface of a first ring of the adjacent rings defining a first axial end of the of axial gap and a second ring of the adjacent rings defining a second axial end of the axial gap.

13. The casing structure of claim 10, wherein the plurality of rings engage at least one cam to move at least one of the plurality of rings an in axial direction relative to another one of the plurality of rings.

14. The casing structure of claim 13, wherein the at least one cam includes a plurality of circumferentially extending grooves that engage a corresponding tab on each of the plurality of rings.

15. The casing structure of claim 14, wherein each of the plurality of grooves include a first portion axially spaced from a second portion by an offset portion, wherein the first portion extends in a circumferential direction having a first constant axial position and the second portion extends in a circumferential direction having a second constant axial position spaced axially from the first constant axial position.

16. The casing structure of claim 15, wherein the offset portion for each of the plurality of grooves is circumferentially spaced from an offset in an adjacent one of the plurality of grooves and the offset portion extends in a circumferential and axial direction from the first constant axial position to the second constant axial position.

17. The casing structure of claim 13, wherein the at least one cam includes a plurality of cams spaced around an axis of rotation of the gas turbine engine and each of the plurality of cams is cylindrical having a constant radius to an outermost surface.

18. A method of controlling an axial gap in a casing structure in a gas turbine engine comprising the steps of:
engaging at least one ring with a mechanical connection attached to an actuator;
moving the at least one ring of a plurality of rings in a first axial direction based on a first operating condition of the gas turbine engine to create an axial gap in the casing structure; and
moving the at least one ring of the plurality of rings in a second axial direction based on a second operating condition of the gas turbine engine;
wherein the at least one ring is moveable relative to another ring of the plurality of rings.

19. The method of claim 18, wherein the first operating condition includes cruise engine speed and the first axial direction is downstream.

20. The method of claim 19, wherein the second operating condition is includes transonic blade speed adjacent the casing structure and the second axial direction is upstream.

* * * * *